United States Patent [19]

Mitchell et al.

[11] 4,238,331
[45] Dec. 9, 1980

[54] PROCESS FOR TREATING SEA WATER CONTAINING WAXY LIPIDS

[75] Inventors: Robert W. Mitchell, Inverurie, Scotland; Ernst L. Neustadter, Ruislip, England

[73] Assignee: The British Petroleum Company Limited, Sunbury-on-Thames, England

[21] Appl. No.: 61,198

[22] Filed: Jul. 27, 1979

Related U.S. Application Data

[63] Continuation of Ser. No. 847,422, Nov. 1, 1977, abandoned.

[30] Foreign Application Priority Data

Nov. 1, 1976 [GB] United Kingdom ............... 45275/76

[51] Int. Cl.³ ............................................... C02F 1/00
[52] U.S. Cl. ..................................... 210/698; 166/268
[58] Field of Search ................... 210/23 R, 40, 43, 59, 210/DIG. 27, 58; 252/312, 351, 356; 166/268, 275, 276, 278

[56] References Cited

U.S. PATENT DOCUMENTS

| | | | |
|---|---|---|---|
| 1,970,578 | 8/1934 | Schoeller et al. | 252/356 |
| 2,213,477 | 9/1940 | Steindorff et al. | 252/351 |
| 2,864,765 | 12/1958 | Stonemon et al. | 210/43 |
| 3,484,370 | 12/1969 | Simon | 210/59 |
| 3,625,857 | 12/1971 | Weimer | 210/59 |
| 3,681,238 | 8/1972 | Emmett | 166/268 X |

FOREIGN PATENT DOCUMENTS

868901 5/1961 United Kingdom ....................... 210/43

*Primary Examiner*—Thomas G Wyse
*Attorney, Agent, or Firm*—Morgan, Finnegan, Pine, Foley & Lee

[57] ABSTRACT

Oil is recovered from a coastal or offshore reservoir by a water injection process in which a dispersing agent is added to sea water which is then filtered. The treated sea water is then injected into a reservoir through an injection well and crude oil is recovered from a production well.

5 Claims, No Drawings

PROCESS FOR TREATING SEA WATER CONTAINING WAXY LIPIDS

This is a continuation of application Ser. No. 847,422 filed Nov. 1, 1977, now abandoned.

The present invention relates to a method of filtration, particularly for use in a method for the recovery of oil, and more particularly to the recovery of oil from coastal or offshore locations. It further relates to a method for the recovery of crude oil from an oil reservoir which method involves the injection of sea water into the reservoir.

A petroleum reservoir consists of a suitably shaped porous stratum of rock which is sealed with an impervious rock. The nature of the reservoir rock is extremely important as the oil is present in the small spaces or pores which separate the individual rock grains. Sandstones and limestones are generally porous and in the main these are the most common types of reservoir rocks. Porous rocks may sometimes also contain fractures or fissures which will add to the oil storing capacity of the reservoir.

Crude oil is generally found in a reservoir in association with salt water and gas. The oil and gas occupy the upper part of the reservoir and below there may be a considerable volume of water which extends throughout the lower levels of the rock. This water bearing section of the reservoir, which is under pressure, is known as the "aquifer". Dependent upon the characteristics of the crude, the temperature and the pressure, the gas may exist in solution in the oil or as a separate phase in the form of a gas cap. Dependent upon the shape of the structure the petrography of the reservoir rocks, the crude migration history and the geology of the area, the aquifer may or may not be present as a recognisable entity.

For oil to move through the pores of the reservoir rock and out into the bottom of a well, the pressure under which the oil exists in the reservoir must be greater than the pressure at the bottom of the well.

The water contained in the aquifer is under pressure and is one source of potential energy. The dissolved gas associated with the oil is another and so is the free gas cap when this is present. The production mechanisms which owe their existence to these sources of energy are referred to as "water drive", "solution gas drive" (or "depletion drive") and "gas cap drive" respectively. The natural drainage of the oil through the reservoir rock under its own gravity may augment or dominate the depletion drive mechanism. A combination of drive mechanisms may operate in the same reservoir. Generally, however, one system will dominate the others.

The present invention is particularly applicable to the water drive mechanism which will be described in more detail below.

Where the aquifer extends over a large area and is as porous and permeable as the oil-bearing portion of the reservoir, the large volume of water which is under pressure in the surrounding parts of the main formation is more or less in direct contact with the oil. Under these conditions there is a large store of energy available to maintain the pressure of the oil zone while production is taking place. This energy comes from the expansion of the aquifer water caused by the reduction in pressure resulting from the removal of oil from the reservoir coupled with a contraction of the actual pore spaces and thus compaction of the rock as a whole.

Although water is only very slightly compressible, there is usually a considerable volume of water in the aquifer—compared to the volume of oil in the oil zone—and its volume increase, due to a very small drop in pressure, can be very great. The water moves into the pores and sweeps the oil out of them as it advances. Under this mechanism the reservoir pressure will tend to be maintained to an extent depending on the size and permeability of the aquifer and the rate of oil production, and the displacing action of the water can result in the recovery of a relatively high proportion of the oil originally present in the oil zone.

Water drive is considered to be the most effective recovery mechanism of all. In order to enable this mechanism to function at its maximum effectiveness it may be necessary to limit the rate of oil production so that the aquifer water can enter the vacated section of the oil bearing zone as fast as the oil is withdrawn. If the oil production rate exceeds this limit there will be a decline in the reservoir pressure and a consequent reduction in the energy available to produce the oil.

A time may come in the life of an oilfield when the natural pressure of the reservoir has declined to an extent where it is no longer sufficiently large to force the oil out of the pores of the rock into the bottom of the well. This stage can be reached long before the greater part of the oil has been recovered from the reservoir.

Formerly it was the practice to rely on natural drive for as long as possible, only resorting to artificial production methods when the natural pressure dropped too low to sustain a reasonable flow. However, it has now been established that the eventual recovery of oil from a reservoir can be much greater if the pressure is not allowed to drop significantly in the early stages of production. Similarly, by utilizing artificial means of maintaining pressure early in the life of a reservoir, production offtake rates may often be maximized to economic advantage.

Thus in order to maintain pressure, or to accelerate the natural drive, or to initiate a drive where none occurs naturally, it is frequently necessary to employ the technique known as secondary recovery. The simplest method of forcing the oil out of the reservoir rock is by direct displacement with another fluid. When water is used, the secondary recovery process is called water flooding.

Water flooding is one of the most successful and extensively used secondary recovery methods. Water is injected under pressure into the reservoir rock via injection wells and drives the oil through the rock via injection wells and drives the oil through the rock into nearby producing wells. In this type of operation it is most important to ensure that the injection water is free from suspended particles or any chemical or biological substances which might cause a partial or complete blockage of the pore channels in the reservoir rock.

With offshore or coastal oil reservoirs, i.e. reservoirs having an abundant readily available supply of sea water, it is clearly an advantage to make use of this. However, raw seawater is not suitable for direct injection for numerous reasons. It contains significant quantities of dissolved oxygen, about 10 ppm at 10° C., which are sufficient to induce corrosion and encourage bacterial growth. In addition, of course, sea water contains dissolved salts, chiefly chlorides of sodium and magnesium, but calcium, sulphates, carbonates and bicarbonates are also present together with numerous trace elements and radicals. Sea water is slightly alkaline, having a pH of about 7.6. It also contains inorganic detritus, marine organisms and bacteria, the amounts of which can vary with the season and the extent to which platform construction has influenced the buildup of new eco-systems. Because of this, sea water must be subjected to an exhaustive treatment procedure before injection including sterilisation, deoxygenation and the addition of various inhibitors.

It is necessary to filter the water before injection but the filtration step gives rise to particular problems.

The residue resulting from filtration may be a gelatinous material of indeterminate composition of both organic and inorganic origin. Because of prior treatment the sea water and its contents are generally subjected to severe shearing, e.g. by pumps, and the action of heat supplied to assist deoxygenation, before filtration.

The residue is an intractable material which quickly clogs conventional filter media, adheres to them and is difficult to remove by conventional back washing techniques.

It is believed that the material is retained on the filter by several mechanisms including but not limited to adsorption, bioadhesion and Van der Waals forces.

Sand filters have been suggested for the removal of this material from sea water because of their filtering efficiency and ease of regeneration, but these are bulky and heavy and are unsuitable for use on offshore platforms where space and weight are at a premium.

There is therefore a two-fold problem which cannot be solved by the use of conventional filters—firstly the tendency of conventional filters to blocks, and, secondly and more importantly, the inability of conventional filters to retain all the potentially harmful material.

We have not discovered that the material which passes through the filter contains waxy lipids resulting from the destruction of copepods. These materials are liquid when formed and therefore pass through conventional filters but may subsequently harden and therefore may block any porous medium in which they may be situated.

We have now discovered that these materials may be prevented from aggregating by keeping them dispersed in water by means of a dispersing agent, thus providing water of satisfactory quality for oil field injection or for other industrial uses such as process plant cooling water.

Thus according to the present invention there is provided a method for treating a liquid containing solid and liquid impurities which method comprises passing the liquid through a filter medium to remove solid impurities and adding a dispersing agent to maintain liquid impurities in a finely dispersed state.

In this context, the word "solid" includes "gelatinous" within its scope.

The method is particularly suitable for the filtration of sea water containing macerated organic and possibly inorganic detritus and thus according to a further feature of the invention there is provided a method for the treatment of sea water which method comprises passing the sea water through a filter medium to remove solid impurities and adding a dispersing agent to maintain liquid impurities in a finely dispersed state.

A suitable filter medium is described in our copending patent application No. 11957/77 (BP Case 4343).

Thus the filter medium may comprise fibres having a diameter in the range 8 - 15 micron which have a high Hamaker constant and which are moderately hydrophilic.

If the fibres are hydrophobic then bio-adhesion of the proteinaceous material is very strong and regeneration of the filter by washing becomes very difficult.

Preferably the fibres are not negatively charged at the pH of the sea water. A negative charge would set up repulsive forces with the marine exudations which are themselves negatively charged.

Preferably the filter medium has a narrow pore size distribution, i.e., is a homogenous mix.

Preferably the filter medium has a water permeability of about 20 $l/dm^2/min$ at 2-3 psig.

Suitably the filter medium is 2-20 mm thick, preferably about 10 mm thick.

Suitable fibre materials for the filter medium include metals, inorganic oxides and organic polymers, e.g., polyamides, polyacrylics, polyesters, phenolic resins and regenerated cellulose.

The dispersing agent is preferably added before the liquid is filtered.

Suitable dispersing agents include oil soluble dispersants and water soluble dispersants.

Preferably the HLB value of the dispersing agent is in the range 8 to 18.

The preferred dispersing agents are non-ionic in compositon, most preferably polyoxyalkylene alkanols. Of the latter, the most preferred has a polyoxyethylene chain containing 8 to 12 oxyethylene groups and an alkanol chain containing not more than 12 carbon atoms. A balance between the oxyethylene and alkanol chains controls the molecule's surface activity, solubility and critical micelle concentration.

According to a further feature of the present invention there is provided a method for the recovery of oil from a coastal or offshore reservoir which method comprises the steps of adding a dispersing agent to sea water, filtering the sea water through a filter medium as hereinbefore described, injecting the treated sea water into the reservoir through an injection well and recovering crude oil from the reservoir through a production well.

The invention is illustrated with reference to the following examples.

EXAMPLES

Dispersions of model waxes (hexadecyl oleate or oleyl oleate) at the 100 ppm level in North Sea water were used to test the dispersive effects of various dispersants which were added at the 100 ppm level. The wax dispersions were prepared by hand shaking followed by ultrasonic vibration; on addition of the dispersant, the samples were vigorously shaken by hand.

The techniques used to monitor changes in the wax dispersions were (i) the turbidity of the dispersions (detected by direct observations coupled to a more sensitive detection with a spectrophotometer) and (ii) the wax droplet sizes as seen under an optical microscope.

All experiments were carried out at room temperature.

The following results were obtained:

| Dispersant | Type | Effects Noted |
|---|---|---|
| Sodium lauryl Sulfate | Anionic | Large droplets formed on standing overnight. |
| CTAB | Cationic | Initial reduction in droplet sizes but drops |

-continued

| Dispersant | Type | Effects Noted |
| --- | --- | --- |
| Empilan KA5 | Non-ionic | creamed on standing. Clear solution slowly given (within 30 minutes). |
| Empilan KA 590 | Non-ionic | Clear solution slowly given (within 30 minutes). |
| Pluronic F68 | Non-ionic | Some reduction in droplet size. Reasonably stable. |

We claim:

1. A method for treating sea water containing waxy lipids to prevent clogging of a filter upon filtration thereof, which method comprises adding a non-ionic dispersing agent to said sea water before the sea water is filtered to maintain said waxy lipids in a dispersed state, passing the sea water through a filter medium comprising fibers not negatively charged at the pH of sea water to remove solid impurities.

2. A method according to claim 1 wherein the filter medium comprises fibers having a diameter in the range 8–15 micron.

3. A method according to claims 1 or 2 wherein the dispersing agent has a HLB value in the range 8 to 18.

4. A method according to claims 1 or 2 wherein the non-ionic dispersant is a polyoxyalkylene alkanol.

5. A method according to claim 4 wherein the polyoxyalkylene chain of the dispersant contains 8 to 12 oxyethylene groups and the alkano chain contains not more than 12 carbon atoms.

* * * * *